(12) United States Patent
LaBruno et al.

(10) Patent No.: US 7,175,417 B2
(45) Date of Patent: Feb. 13, 2007

(54) APPARATUS FOR FORMING FOOD PATTIES HAVING SURFACE INDENTATIONS

(75) Inventors: Ronald F. LaBruno, Mount Prospect, IL (US); Douglas Conerton, Bourbonnais, IL (US)

(73) Assignee: Formax, Inc., Mokena, IL (US)

( * ) Notice: Subject to any disclaimer, the term of this patent is extended or adjusted under 35 U.S.C. 154(b) by 308 days.

(21) Appl. No.: 10/811,066

(22) Filed: Mar. 26, 2004

(65) Prior Publication Data

US 2005/0214399 A1    Sep. 29, 2005

(51) Int. Cl.
*A22C 7/00* (2006.01)

(52) U.S. Cl. ............... 425/556; 425/192 R; 425/195; 425/422; 425/574; 249/102; 249/103; 249/104

(58) Field of Classification Search ............ 425/192 R, 425/422, 574, 556, 195; 249/102, 103, 104; *A22C 7/00*
See application file for complete search history.

(56) References Cited

U.S. PATENT DOCUMENTS

| | | |
|---|---|---|
| 4,054,967 A | 10/1977 | Sandberg et al. |
| RE30,096 E | 9/1979 | Richards |
| 4,418,446 A * | 12/1983 | Sandberg et al. ........... 425/574 |
| 4,634,362 A * | 1/1987 | Koppens ..................... 425/287 |
| 4,768,260 A | 9/1988 | Sandberg |
| 4,996,743 A | 3/1991 | Janssen |
| 5,022,888 A | 6/1991 | Lindee |
| 6,428,303 B2 | 8/2002 | Lindee et al. |

OTHER PUBLICATIONS

Sketch of Prior Art Tooling (Admitted Prior Art).

* cited by examiner

*Primary Examiner*—Joseph S. Del Sole
(74) *Attorney, Agent, or Firm*—The Law Office of Randall T. Erickson, P.C.

(57) ABSTRACT

A food patty-forming apparatus for forming food patties from pressurized food product includes a mold plate that is guided to reciprocate longitudinally between a fill position and a discharge position. The mold plate has a cavity that is open to the source of pressurized food product when in the fill position. The cavity is exposed when in the discharge position. A mold pattern having open areas and solid areas is arranged adjacent a first face of the cavity, and indented from a second face. A knockout plunger has open areas corresponding to the solid areas of the pattern and solid areas corresponding to the open areas of the mold pattern. The knockout plunger is shaped to allow the solid areas of the plunger to penetrate into the cavity past the first face of the cavity around the solid areas to displace a patty formed in the cavity.

19 Claims, 3 Drawing Sheets

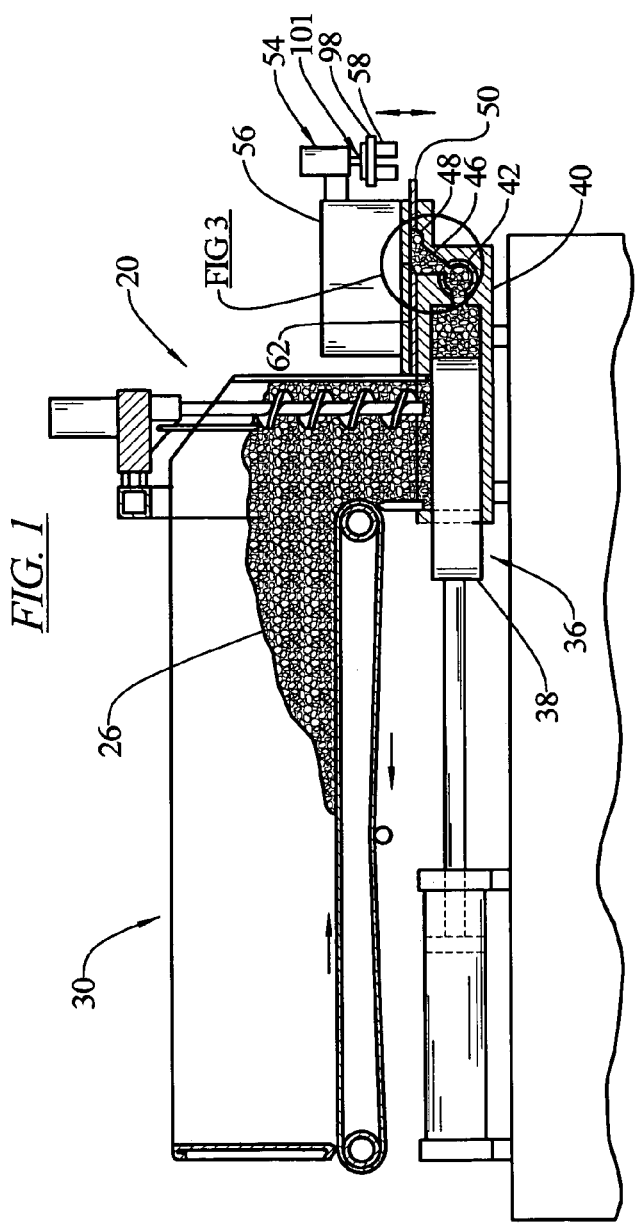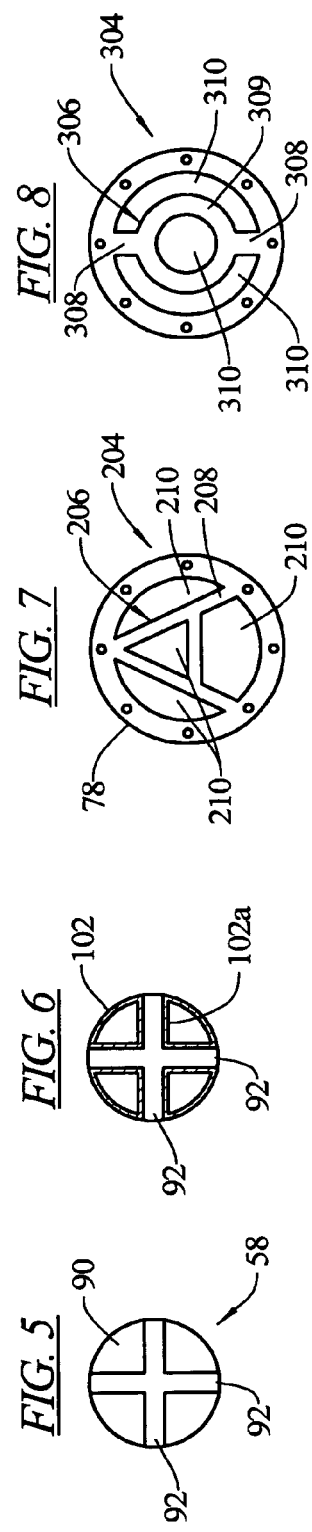

APPARATUS FOR FORMING FOOD PATTIES HAVING SURFACE INDENTATIONS

TECHNICAL FIELD OF THE INVENTION

The invention relates to a food patty-forming machine. Particularly, the invention relates to a reciprocating mold plate food patty-forming machine.

BACKGROUND OF THE INVENTION

Increasing use of pre-processed foods in homes and restaurants and other group eating establishments has created a demand for high-capacity automated food processing equipment. That demand is particularly evident with respect to hamburgers, molded steaks, fish cakes, and other molded food patties.

To increase consumer appeal it is known to provide a patty-molding or patty-forming machine with a mold plate having contoured cavities to form a two-dimensional horizontal profile patty that is curved or otherwise irregular to simulate the shape of a food item, such as a chicken drumstick. It is also known to provide a patty-molding or patty-forming machine with a mold plate with contoured cavities to form a two-dimensional horizontal profile patty, and an overlying breather plate with contoured areas, to provide a two-dimensional horizontal profile patty that also has a contoured top surface. However, in this arrangement, the bottom of the mold plate is flat to be flush against the flat fill plate or support plate provided on the mold patty forming machine. The corresponding molded patty has a flat bottom.

It is also known to provide a molded patty with ridges formed in the patty along the longitudinal direction of movement of the mold plate, such as described in U.S. Pat. No. 4,418,446. It is also known to provide a molded patty with a center groove along the longitudinal direction of movement of the mold plate for the purpose of breaking the finished patty along the groove. Such an arrangement is useful for portion control for animal food and animal medicine.

The present inventors have recognized the desirability of providing a patty-forming apparatus that is capable of molding a food patty having one or more non-longitudinal depressions in at least the top surface of the patty.

The present inventors have recognized the desirability of providing a patty-forming apparatus that is capable of molding a food patty, the patty having one or more grooves in a top surface thereof that are not arranged in a longitudinal machine direction.

The present inventors have recognized the desirability of providing tooling for retrofitting a food patty-forming machine, wherein the tooling can provide for the molding of a food patty having one or more non-longitudinal depressions in at least the top surface of the patty.

The present inventors have recognized the desirability of providing a tooling for retrofitting a patty-forming machine, wherein the tooling can provide for the molding of a food patty, the patty having one or more grooves in a top surface thereof that are not arranged in a longitudinal machine direction.

The present inventors have recognized the desirability of providing a patty-forming apparatus or tooling that is capable of molding a food patty that has grooves facilitating breaking of the patty into three or more parts.

SUMMARY OF THE INVENTION

The invention provides a food patty-forming apparatus for forming shaped food patties from pressurized food product wherein the food patty can include non-longitudinally projected indentations. The invention also provides tooling for a food patty-forming apparatus, wherein a food patty-forming apparatus could be converted to one in which the food patty formed thereby can include non-longitudinally projected indentations.

The invention provides an improved mold plate for a food patty-forming apparatus that forms food patties from pressurized food product. The apparatus includes a frame, a first surface carried by the frame, a second surface also carried by the frame, a source of pressurized food product, the mold plate and a reciprocation mechanism operatively connected to the mold plate. The second surface is spaced from and facing the first surface. The mold plate is guided to reciprocate longitudinally between the first and second surfaces between a fill position and a discharge position by action of the reciprocation mechanism.

The mold plate has at least one cavity that is open to the source of pressurized food product through the first surface when in the fill position. The cavity is outside the first and second surfaces when in the discharge position. According to the invention, a mold pattern is arranged adjacent a first face of the cavity. The mold pattern comprises open areas and solid areas. The solid areas are within the volume of the cavity. The solid areas have a portion extending in a non-longitudinal direction.

The invention provides a knockout plunger that has open areas corresponding in shape to the solid areas of the mold pattern. The plunger has solid areas corresponding in shape to the open areas of the mold pattern. The knockout plunger is shaped to allow the solid areas of the plunger to penetrate into the cavity past the first face of the cavity.

The solid areas of the pattern can comprise a cross shape.
The solid areas of the plunger can comprise solid blocks or cup-shaped configurations.

The solid portions of the pattern can comprise curved portions.

The solid portions of the pattern can comprise oblique portions.

The solid portions of the pattern can be carried on an insert plate that is fastened to surrounding portions of the mold plate, or can be formed in unitary fashion with the mold plate. The insert plate can comprise an outside surface planar with the first face of the cavity that is flush with a surrounding surface of the mold plate.

The cavity can be open to the source of pressurized food through a second face of the cavity on a side of the cavity opposite the first face. The first surface can comprise breather holes for venting air during filling of the cavity.

According to the preferred embodiment of the invention, a plurality of cavities are provided through the mold plate, and an insert plate is installed onto each cavity, the insert plates being identically configured. However, the invention is not limited to this embodiment. There may be applications where it is desirable that the insert plates have varying shapes and configurations.

The mold plate includes annular recesses, each of which surround a cavity. The insert plates are each respectively fixed into one of the surrounding annular recesses. The insert plates each include a surrounding annular base that fits within the respective annular recess, and an interior area within the annular base. The interior area includes open areas and pattern-forming solid areas. The interior area is substantially in registry with the respective cavity. The pattern-forming solid areas occupy regions within the cavity so as to form a pattern in the top surface of the formed patty.

The insert plates have a thickness such that when set into the annular recesses, the insert plates include a top surface that is flush with surrounding top surfaces of the mold plate. Thus, when the insert plates are fixed to, or formed with, the mold plate, a continuous, substantially flat top surface of the mold plate is provided.

According to the preferred embodiment, the pattern formed by the solid areas can comprise a cross pattern of tapered grooves. These grooves allow the finished patty to be broken into quadrants, i.e., four substantially equal pieces. Other patterns are encompassed by the invention including letters, designs, shapes, logos, or any other desirable pattern. The solid areas can include transversely extending, obliquely extending, and/or arcuately extending elements.

In order to displace the patties from the cavities when the mold plate is in the discharge position, a plurality of knockout plungers are provided. Each knockout plunger has a shape that corresponds to the open areas of the interior area of the respective insert plate. By being so shaped, the knockout plunger can be driven down into the cavity through the insert plate to displace the formed patty from the cavity.

The mold plate is supported on a fill plate and located beneath a breather plate, all carried by a frame of the molding apparatus. The breather plate includes breather holes that are in communication with the cavity during filling of the cavity with food product, the breather holes also being in communication with non-pressurized atmosphere. The mold plate is arranged to reciprocate longitudinally between the fill plate and the breather plate between the fill position and the discharge position. Alternatively, the relative vertical positions of the fill plate and the breather plate can be reversed depending on the style of the molding machine. In such case the mold plate is supported on the breather plate.

The invention provides an apparatus or tooling to form patterns into patties without the requirement that the patterns are longitudinally extruded or projected along the longitudinal direction of movement of the mold plate between the fill position and the discharge position. The invention allows for forming patterns with non-longitudinally projected elements such as laterally, obliquely or arcuately extending elements, into the top surface of a formed patty.

The non-longitudinally projected elements can include one or more ridges for forming a pattern on the formed patty. The pattern can form grooves for dividing the patty into breakaway areas. The non-longitudinally arranged elements can form letters, designs, shapes, logos, or any other desirable pattern.

Numerous other advantages and features of the present invention will become readily apparent from the following detailed description of the invention and the embodiments thereof, and from the accompanying drawings.

BRIEF DESCRIPTION OF THE DRAWINGS

FIG. 1 is a fragmentary, diagrammatic elevational view of a patty-forming apparatus incorporating the present invention;

FIG. 5 is a view taken generally along line 5—5 of FIG. 2;

FIG. 6 is a bottom view taken generally along line 5—5 of FIG. 2 showing an alternate construction;

FIG. 7 is a plan view of an alternate insert plate to those shown in FIG. 2;

FIG. 8 is a plan view of a further alternate insert plate to those shown in FIG. 2.

DETAILED DESCRIPTION OF THE PREFERRED EMBODIMENTS

Figure 2:
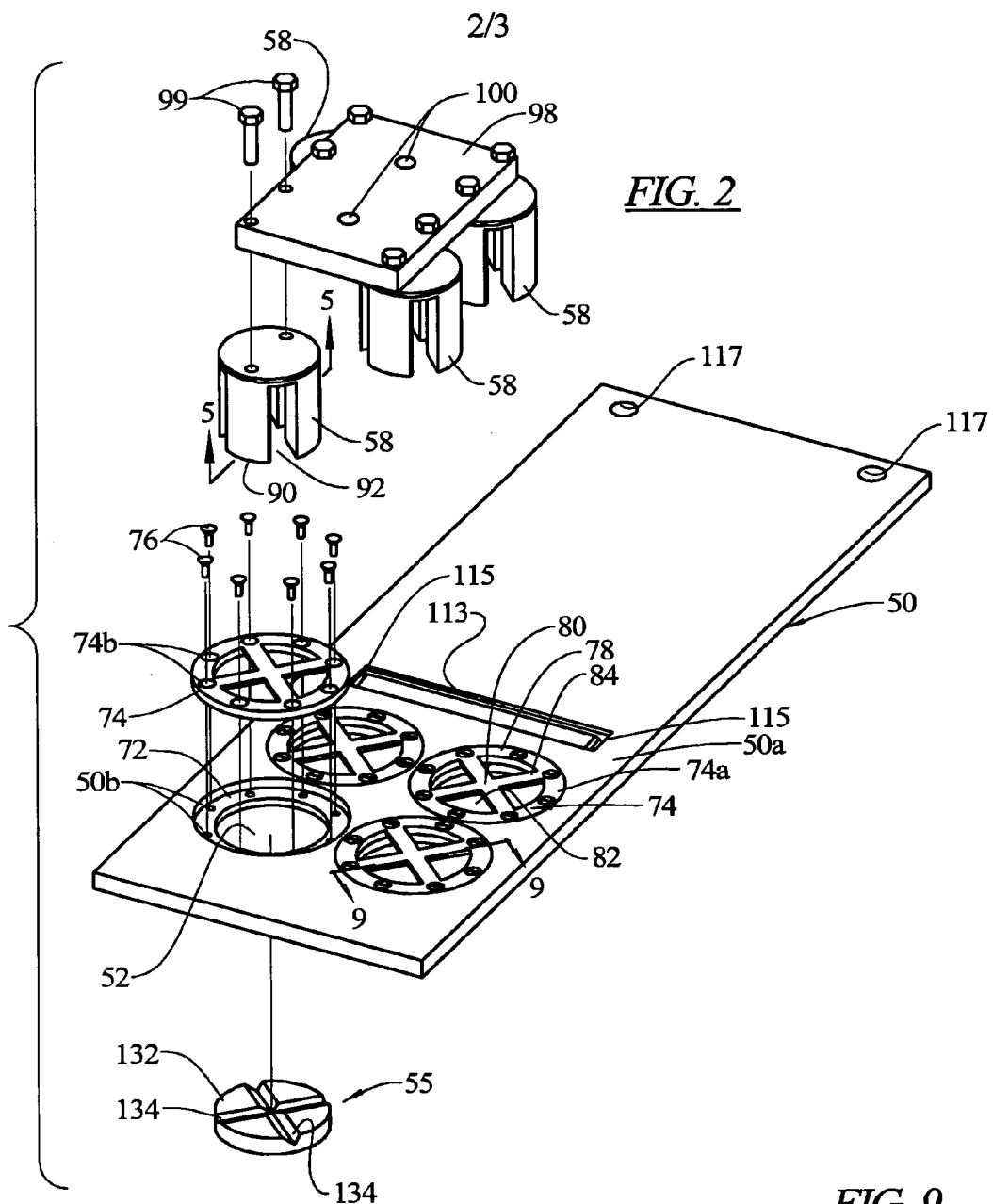
FIG. 2 is an enlarged, exploded perspective view of a mold plate and knockout plunger arrangement taken from FIG. 1.

While this invention is susceptible of embodiment in many different forms, there are shown in the drawings, and will be described herein in detail, specific embodiments thereof with the understanding that the present disclosure is to be considered as an exemplification of the principles of the invention and is not intended to limit the invention to the specific embodiments illustrated.

FIG. 1 illustrates a food patty-forming apparatus 20 incorporating the structure of the present invention. The food patty-forming apparatus 20 can generally be configured substantially as shown and described in one or more of U.S. Pat. Nos. RE 30,096; 6,428,303; 4,418,446; 4,768,260; or 4,054,967, all herein incorporated by reference. The food patty-forming apparatus can be a FORMAX F-6, F-12, F-19, F-26, F-400 or MAXUM700 reciprocating mold plate forming machine, available from Formax, Inc. of Mokena, Ill., U.S.A.

According to a typical patty-forming apparatus, a supply of food product 26 is contained within a hopper 30 and conveyed into a food pump 36 comprising a piston or plunger 38 that compresses the food product into a cylinder 40. The food product 26 is directed through a tube valve 42 which directs the pressurized food product through a fill channel 46 and through a fill plate 48. A reciprocating mold plate 50, having mold plate cavities 52, is located above the fill channel 46 and fill plate 48 when in a fill position, and reciprocates to a discharge or knockout position such that the filled mold cavities are exposed, wherein a knockout mechanism 54 removes the patties 55 (FIG. 2) from the mold plate cavities 52. The knockout mechanism 54 includes a knockout drive 56 which vertically reciprocates knockout plungers 58 which are sized and shaped to pass into the cavities 52 such that the downward traveling knockout plungers 58 remove the patties from the respective cavities. The knockout mechanism 54 and knockout drive 56 can be configured as described in one or more of U.S. Pat. Nos. RE 30,096; 6,428,303; 4,418,446; 4,768,260; or 4,054,967, or as provided in one or more of the commercially available patty-forming machines from Formax, Inc.

The knockout plungers 58 correspond in number to the cavities 52. The vertical movements of the knockout plungers 58 are synchronized for movement with the horizontal reciprocation of the mold plate 50.

A breather plate 62 is located above the mold plate. The breather plate provides breather holes to remove air from the cavities during filling.

Figure 3:
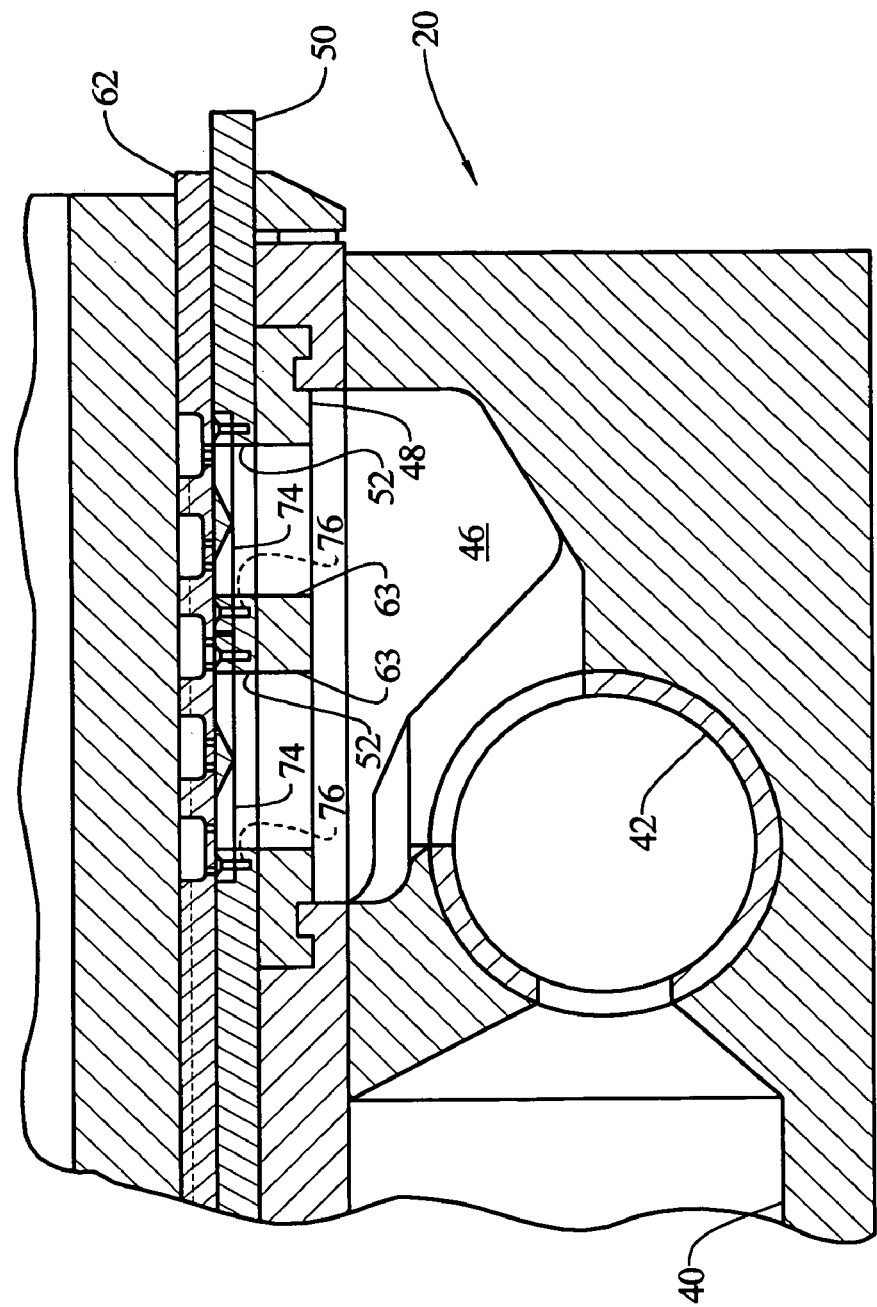
FIG. 3 is a fragmentary, enlarged top sectional view of the patty-forming apparatus of FIG. 1.

FIGS. 1 and 3 illustrate the apparatus with a mold plate 50 in a fill position. FIG. 2 illustrates the mold plate 50 and knockout mechanism 54 in the discharge or knockout position. As it is understood from the aforementioned patents, the mold plate 50 is reciprocated horizontally from the knockout position rearward to the fill position above the fill channel 46. The pressurized food product is filled from below into the cavities 52 of the mold plate via ports 63 formed through the fill plate 48. In the illustrated embodiment, the ports 63 correspond in number and shape to the cavities. However, the invention also encompasses smaller or larger ports, narrow slots, a single port or narrow slot that fills more than one cavity or more than one row of cavities, a plurality of small perforations that function as ports, or any of the known fill arrangements into patty-forming cavities of a reciprocating mold plate forming machine.

It is also encompassed by the invention that the fill channel 46 and fill plate 48 could be located above the mold plate with the breather plate 62 below the mold plate.

The mold plate 50 can be horizontally reciprocated by being engaged at its rear end portion such as shown in U.S. Pat. No. 6,428,303 or engaged at its front end portion by drive rods as shown and described in U.S. Pat. No. RE 30,096.

The food product 26 within a hopper 30 can be conveyed along a bottom of the hopper such as described in U.S. Pat. No. RE 30,096, and/or conveyed by the use of motor driven screws 36 as described in U.S. Pat. Nos. RE 30,096, 4,054, 967, or 4,418,446.

The present invention provides an improved mold plate 50. The mold plate 50 includes annular recesses 72 that each surrounds a cavity 52. The mold plate includes an insert plate 74 that is fit into each recess. The insert plates 72 have select thicknesses such that when installed, the insert plates 74 have a top surface 74a that is flush with surrounding surfaces 50a of the mold plate 50. The insert plates 74 are attached to the mold plate 50 using fasteners 76. The insert plates 74 include a plurality of the counter sunk bores 74b that allow heads of the fasteners 76 to be flush with, or below, the surface 74a when the fasteners 76 are threaded completely into threaded bores 50b of the mold plate.

The insert plate could alternately be formed in unitary fashion with the rest of the mold plate, rather than being fastened to the rest of the mold plate.

Figure 9:
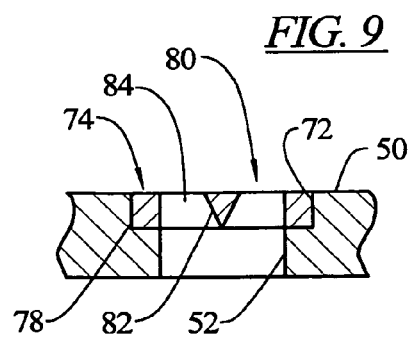
FIG. 9 is a sectional view taken generally along line 9—9 of FIG. 2.

Each insert plate 74 includes an annular frame 78 and an interior area 80. The interior area 80 comprises a selected pattern that includes open areas 82 and solid areas 84. In the illustrated embodiment of FIG. 2, the solid areas 82 comprise an "X" pattern. The solid areas 82 include a notch-shape or triangular shape in cross section as shown in FIG. 9, to form a corresponding shape on the formed patty 55 as described below.

As illustrated in FIGS. 2 and 5 the knockout plungers 58 each have solid areas 90 that correspond in outside shape, albeit slightly smaller, to the open areas 84 of the respective insert plate 74. The plungers 58 each have open areas 92 that correspond in shape, albeit slightly larger, to the solid areas 82 of the respective insert plate 74. Thus, each plunger 58 can be moved through the respective insert plate 74 to displace a patty 55 within the cavity 52, during a knockout operation.

The illustrated four plungers 58 can be solid blocks that are fastened to a knockout plate 98 by fasteners 99. The plate 98 has attachment holes 100 such that the plate can be attached to a knockout arm 101 (FIG. 1) that is raised and lowered by the drive 56.

Alternatively, the solid areas 90 of the plungers 50 can be cup-shaped areas 102 as shown in FIG. 6, wherein the relatively thin walls 102a of the cup-shaped areas act to displace the patties.

Returning to FIG. 2, the mold plate 50 further includes a recess 113 open to through-holes 115. The recess 113 and holes 115 are used for lubricating the top surface of the plate 50 with product and balancing pressure on opposite faces of the mold plate. At a rear edge of the plate 50 are located drive keys 117 used for connecting the plate 50 to a drive mechanism.

As shown in FIG. 2, the mold plate 50 includes four cavities 52 arranged in a grid pattern with two rows spaced apart along a longitudinal direction of movement of the mold plate 50. Although two rows of cavities 50 are shown, any number or rows, and cavities within each row, are encompassed by the invention. The cavities can be in staggered rows or straight rows.

Figure 4:
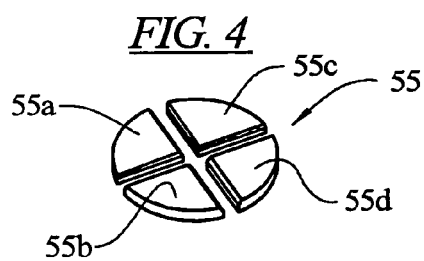
FIG. 4 is a perspective view of a patty taken from FIG. 2 shown broken apart.

FIG. 2 illustrates a completed patty 55 from the patty forming machine 20. The patty includes a contoured top surface 132, having crossed divider grooves 134 that allow the patty 55 to be broken into four equal pieces 55a, 55b, 55c, 55d as shown in FIG. 4. It is also possible that the patty could be formed with unequal portions, or equal portions of a different fraction, such as equal one third portions. The invention is particularly advantageous when it is desired to divide a single patty into pre-selected portions. One example of this situation is the case of animal foods or medicines wherein a recommended, pre-selected portion might depend on the weight of the animal, wherein fractions of a patty could be broken off to administer to the animal.

FIG. 7 illustrates an alternate embodiment insert plate 204 that has an interior area 206 that utilizes a select design; in this case solid areas 208 are in the form of the letter "A". The solid areas 208 thus include transversely and obliquely extending elements. If this design was utilized, the knockout plungers such as shown in FIG. 5 or 6 would have solid areas corresponding to open areas 210 of the interior area 206 and open areas corresponding to the solid areas 208.

FIG. 8 illustrates an alternate embodiment insert plate 304 that has an interior area 306 that utilizes a design wherein solid areas include some straight areas 308 and a curved or arcuate portion 309, in this case a complete ring. If this design was utilized, the knockout plungers such as shown in FIG. 5 or 6 would have solid areas corresponding to open areas 310 of the area 306 and open areas corresponding to the solid areas 308, 309.

The mold plate and the insert plates can be composed of metal as known in the art. The knock out plungers can be composed of metal, such as aluminum, or plastic materials as known in the art.

From the foregoing, it will be observed that numerous variations and modifications may be effected without departing from the spirit and scope of the invention. It is to be understood that no limitation with respect to the specific apparatus illustrated herein is intended or should be inferred.

The invention claimed is:

1. A food patty-forming apparatus for forming food patties from pressurized food product, comprising:
   a frame;
   a first surface carried by said frame;
   a second surface carried by said frame, said second surface spaced from and facing said first surface;
   a source of pressurized food product;
   a mold plate guided to reciprocate longitudinally between said first and second surfaces between a fill position and a discharge position, said mold plate having at least one cavity that is open to said source of pressurized food product through said second surface when in said fill position and that is outside said first and second surfaces when in said discharge position, and a mold pattern arranged on one first face of said cavity, said mold pattern comprising open areas and solid areas, said solid areas defining a cross shape and said open areas comprise four open areas; and a mechanism operatively connected to said mold plate to reciprocate said mold plate between said fill position and said discharge position.

2. The apparatus according to claim 1, comprising a knockout plunger having open areas corresponding to said solid areas of said pattern and solid areas corresponding to said open areas of said pattern, and shaped to allow said solid areas of said plunger to penetrate into said cavity past said first face of said cavity.

3. The apparatus according to claim 1, wherein said cavity is open to said source of pressurized food through a second face of said cavity on a side of said cavity opposite said first face.

4. The apparatus according to claim 3, wherein said second surface comprises breather holes for venting air during filling of said cavity.

5. The apparatus according to claim 1, wherein said solid areas of said plunger comprise a cup configuration.

6. The apparatus according to claim 1, wherein said solid portions of said pattern are carried on an insert plate that is fastened to surrounding portions of said mold plate.

7. The apparatus according to claim 6, wherein said insert plate comprises an outside surface facing away from said cavity that is flush with a surrounding surface of said mold plate.

8. Tooling for an apparatus that includes a mold plate having a patty-forming cavity for a food patty-forming apparatus for forming food patties from pressurized food product, the apparatus having a food product delivery configured to deliver pressurized food product into a fill opening, a mechanism operatively connected to said mold plate to reciprocate said mold plate between a fill position wherein said cavity is open to said fill opening to receive pressurized food product, and a discharge position wherein said cavity is exposed, the tooling comprising:

a mold plate having a cavity having a first open face and an opposite second open face on opposite sides of said mold plate, a mold pattern arranged adjacent said first open face of said cavity, said mold pattern comprising open areas and solid areas, said solid areas recessed from said second open face of said cavity, said solid areas defining a cross shape and said open areas comprise four open areas.

9. The tooling according to claim 8, comprising a knockout plunger having open areas corresponding to said solid areas of said pattern and solid areas corresponding to said open areas of said pattern, and shaped to allow said solid areas of said plunger to penetrate into said cavity past said first face of said cavity, when said mold plate is in said discharge position.

10. The tooling according to claim 8, wherein said cavity is openable to said food product delivery through said second open face of said cavity.

11. The tooling according to claim 8, comprising a breather plate configured to guide reciprocation of said mold plate and having breather holes for venting air during filling of said cavity.

12. The tooling according to claim 8, wherein said solid areas of said plunger comprises a cup configuration.

13. The tooling according to claim 8, wherein solid portions of said pattern are carried on an insert plate that is fastened to surrounding portions of said mold plate.

14. The tooling according to claim 13, wherein said insert plate comprises an outside surface facing away from said cavity that is flush with a surrounding surface of said mold plate.

15. Tooling for an apparatus that includes a mold plate having a patty-forming cavity for a food patty-forming apparatus for forming food patties from pressurized food product, the apparatus having a food product delivery configured to deliver pressurized food product into a fill opening, a mechanism operatively connected to said mold plate to reciprocate said mold plate between a fill position wherein said cavity is open to said fill opening to receive pressurized food product, and a discharge position wherein said cavity is exposed, the tooling comprising:

a mold plate having a circular cavity having a first open face and an opposite second open face on opposite sides of said mold plate, a mold pattern arranged adjacent said first open face of said cavity, said mold pattern comprising open areas and solid areas, said solid areas recessed from said second open face of said cavity, said open areas including a plurality of circular sectors at least one of which has an included angle of less than 180 degrees.

16. The tooling according to claim 15, wherein said open areas include four circular sectors each having an included angle of about 90 degrees.

17. The tooling according to claim 15, comprising a knockout plunger having open areas corresponding to said solid areas of said pattern and solid areas corresponding to said open areas of said pattern, and shaped to allow said solid areas of said plunger to penetrate into said cavity past said first face of said cavity, when said mold plate is in said discharge position.

18. The tooling according to claim 17, wherein solid portions of said pattern are carried on an insert plate that is fastened to surrounding portions of said mold plate.

19. The tooling according to claim 18, wherein said insert plate comprises an outside surface facing away from said cavity that is flush with a surrounding surface of said mold plate.

* * * * *